(12) United States Patent
Matsui et al.

(10) Patent No.: US 9,573,584 B2
(45) Date of Patent: Feb. 21, 2017

(54) HYBRID VEHICLE CONTROL DEVICE

(71) Applicant: NISSAN MOTOR CO., LTD., Yokohama-shi, Kanagawa (JP)

(72) Inventors: Hiroki Matsui, Ebina (JP); Hiroki Shimoyama, Ebina (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 41 days.

(21) Appl. No.: 14/653,571

(22) PCT Filed: Dec. 20, 2013

(86) PCT No.: PCT/JP2013/084267
§ 371 (c)(1),
(2) Date: Jun. 18, 2015

(87) PCT Pub. No.: WO2014/103937
PCT Pub. Date: Jul. 3, 2014

(65) Prior Publication Data
US 2015/0344019 A1    Dec. 3, 2015

(30) Foreign Application Priority Data
Dec. 25, 2012 (JP) ................................. 2012-280506

(51) Int. Cl.
*B60W 20/10* (2016.01)
*B60W 20/00* (2016.01)
(Continued)

(52) U.S. Cl.
CPC ............. *B60W 20/10* (2013.01); *B60K 6/38* (2013.01); *B60K 6/387* (2013.01); *B60K 6/46* (2013.01);
(Continued)

(58) Field of Classification Search
None
See application file for complete search history.

(56) References Cited

U.S. PATENT DOCUMENTS 9,180,878 B2 * 11/2015 Matsui ..................... B60K 6/48
9,260,108 B2 *  2/2016 Wang ..................... B60W 30/19
(Continued)

FOREIGN PATENT DOCUMENTS

| JP | 2007-069817 A | 3/2007 |
| JP | JP2010-030486 A | 2/2010 |
| JP | 2012-154471 A | 8/2012 |

*Primary Examiner* — Redhwan k Mawari
*Assistant Examiner* — Edward Torchinsky
(74) *Attorney, Agent, or Firm* — Foley & Lardner LLP

(57) ABSTRACT

A hybrid vehicle control device includes an engine start control unit which, at engine start, starts slipping a second clutch, sets a first clutch to a slip-engaged state, and sets the second clutch transmission torque capacity to less than or equal to a set torque limit value during cranking, maintains the slip state and cranks the engine, and when the engine is put in a drive state, controls the first clutch and the second clutch towards a fully engaged state. The engine start control unit is provided with a second clutch torque increase gradient control unit which, when performing cranking processing, performs first increasing processing for increasing the second clutch transmission torque capacity command value at a first increase gradient, and second increasing processing for increasing said value at a second increase gradient more gradual that the first increase gradient.

6 Claims, 11 Drawing Sheets

(51) Int. Cl.
- *B60K 6/46* (2007.10)
- *B60K 6/38* (2007.10)
- *B60K 6/48* (2007.10)
- *B60K 6/547* (2007.10)
- *B60L 11/14* (2006.01)
- *B60W 10/02* (2006.01)
- *B60W 10/06* (2006.01)
- *B60W 10/08* (2006.01)
- *B60K 6/387* (2007.10)
- *B60L 11/08* (2006.01)
- *B60L 15/20* (2006.01)

(52) U.S. Cl.
CPC ............... *B60K 6/48* (2013.01); *B60K 6/547* (2013.01); *B60L 11/08* (2013.01); *B60L 11/14* (2013.01); *B60L 15/2045* (2013.01); *B60L 15/2054* (2013.01); *B60W 10/02* (2013.01); *B60W 10/06* (2013.01); *B60W 10/08* (2013.01); *B60W 20/40* (2013.01); *B60L 2240/421* (2013.01); *B60L 2240/423* (2013.01); *B60L 2240/441* (2013.01); *B60L 2240/443* (2013.01); *B60L 2240/507* (2013.01); *B60L 2260/26* (2013.01); *B60W 2510/06* (2013.01); *B60W 2540/10* (2013.01); *B60W 2710/021* (2013.01); *B60W 2710/027* (2013.01); *B60W 2710/0666* (2013.01); *B60W 2710/081* (2013.01); *B60Y 2300/429* (2013.01); *Y02T 10/6221* (2013.01); *Y02T 10/6286* (2013.01); *Y02T 10/645* (2013.01); *Y02T 10/70* (2013.01); *Y02T 10/7077* (2013.01); *Y02T 10/72* (2013.01); *Y02T 10/7283* (2013.01); *Y10S 903/93* (2013.01)

(56) References Cited

U.S. PATENT DOCUMENTS

| | | | |
|---|---|---|---|
| 9,381,908 B2* | 7/2016 | Matsui | B60K 6/48 |
| 2015/0051766 A1* | 2/2015 | Matsui | B60K 6/48 |
| | | | 701/22 |
| 2015/0314778 A1* | 11/2015 | Matsui | F02D 29/02 |
| | | | 701/22 |
| 2015/0344018 A1* | 12/2015 | Shimoyama | B60K 6/48 |
| | | | 701/22 |

* cited by examiner

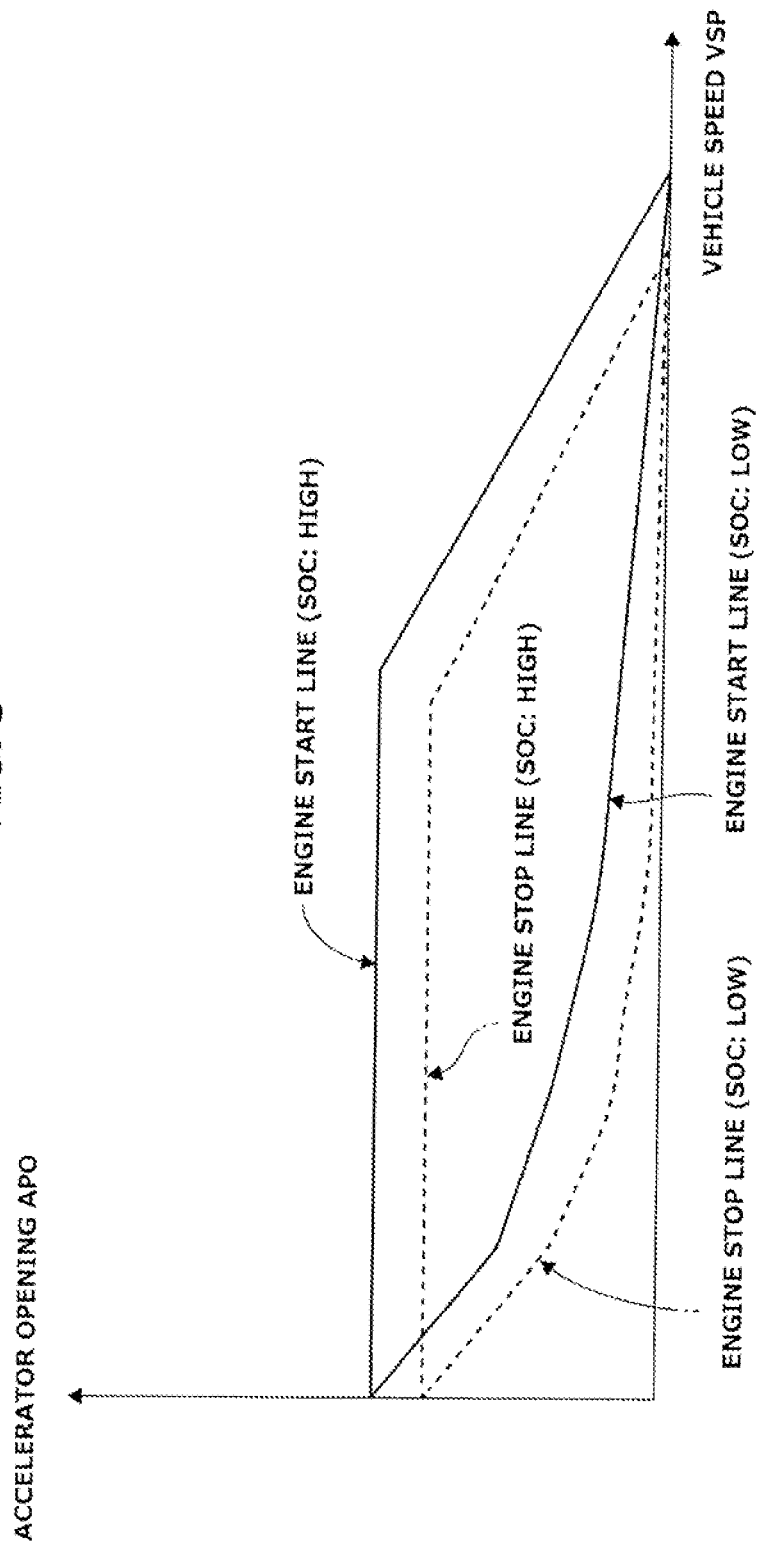

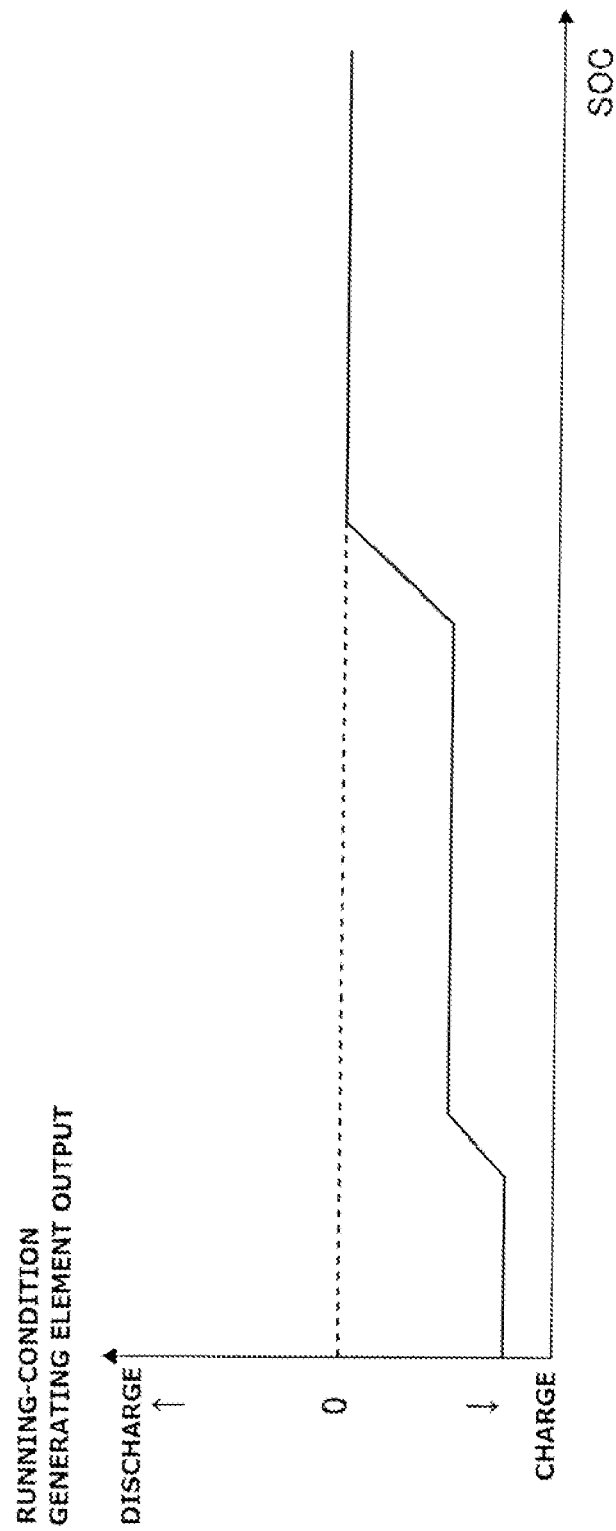

HYBRID VEHICLE CONTROL DEVICE

TECHNICAL FIELD

The present invention relates generally to a hybrid vehicle control apparatus, and particularly to a control at engine start.

BACKGROUND ART

Conventionally, a hybrid vehicle is known which includes a first clutch capable of varying a transmitted torque capacity between an engine and a motor generator as drive sources, and a second clutch capable of varying a transmitted torque capacity between the motor generator and a driving wheel side (see a patent document 1, for example). In this conventional art, an engine start control is performed during a shift from an EV mode to an HEV mode, wherein the EV mode is a mode where the vehicle is driven only by a driving force of the motor generator, and wherein the HEV mode is a mode where the vehicle is driven by both of driving forces of the engine and the motor generator with the engine started, as follows. In the engine start control, the second clutch is first made to slip, and the driving torque of the motor generator is made to rise, and the first clutch is thereafter engaged to input a rotation to the engine (i.e. cranking the engine). As the engine rotational speed rises thereafter, the first clutch is engaged, and the second clutch is controlled from slip state toward engaged state.

When the second clutch is slipping, the transmitted torque capacity of the second clutch is limited to a limit value (cranking-condition torque limit value) for maintaining the second clutch in slip state, and is increased along with control of the first clutch toward complete engagement.

PRIOR ART DOCUMENT(S)

Patent Document(s)

Patent Document 1: JP 2007-069817 A

SUMMARY OF THE INVENTION

Problem(s) to be Solved by the Invention

In the conventional art described above, the transmitted torque capacity of the second clutch is limited to the limit value for maintaining the second clutch in slip state during cranking from the start of slip. However, when the transmitted torque capacity of the second clutch is limited to the limit value for a long time period, vehicle acceleration becomes equal to zero for the time period, resulting in a delay of acceleration.

The present invention is made with attention to the problem described above. It is an object of the present invention to provide a hybrid vehicle control apparatus capable of improvement against such a delay of acceleration at engine start.

Means for Solving the Problem(s)

In order to accomplish the object described above, according to the present invention, a hybrid vehicle control apparatus comprises: an engine start control part configured to perform at engine start: a slip start operation to cause a second clutch to slip; a cranking operation to crank an engine by bringing a first clutch into slip-engaged state, and maintaining the second clutch in slipping state by setting transmitted torque capacity of the second clutch smaller than or equal to a set cranking-condition torque limit value; and a clutch engagement operation to control the first clutch and the second clutch into completely engaged state in response to a condition that the engine is in driving state; and a second clutch torque increase gradient control part included in the engine start control part, and configured to perform the following while the cranking operation is being performed: a first increase operation to increase the transmitted torque capacity of the second clutch at a predetermined first increase gradient from the state of starting to slip; and a second increase operation to increase the transmitted torque capacity of the second clutch at a second increase gradient smaller than the first increase gradient.

Effect(s) of the Invention

According to the present invention, the engine start control part performs at engine start the cranking operation to start the engine by bringing the first clutch into slip-engaged state, and thereafter causing the second clutch to slip. Along with this operation, after the first clutch is started to be slip-engaged, the second clutch torque increase gradient control part performs: the first increase operation to increase the transmitted torque capacity of the second clutch at the first increase gradient relatively large in rate of increase; and thereafter the second increase operation to increase the transmitted torque capacity of the second clutch at the second increase gradient relatively small in rate of increase. Thereby, as compared to the increase only at the first increase gradient relatively large in rate of increase, this serves to delay the timing when the transmitted torque capacity of the second clutch reaches the limit value, and thereby suppress the output from the second clutch to the driving wheel side from being limited by the limit value. This leads to reduction of the delay of acceleration, as compared to cases where the output from the second clutch is limited by the limit value at an earlier timing. In this way, the present invention makes it possible to provide a hybrid vehicle control apparatus capable of improvement against such a delay of acceleration at engine start.

BRIEF DESCRIPTION OF THE DRAWINGS

FIG. 5 is a map diagram showing engine start/stop lines used by the hybrid vehicle control apparatus according to the first embodiment.

FIG. 6 is a characteristic diagram showing a running-condition requested generation output with respect to a battery SOC, used by the hybrid vehicle control apparatus according to the first embodiment.

MODE(S) FOR CARRYING OUT THE INVENTION

Figure 1:
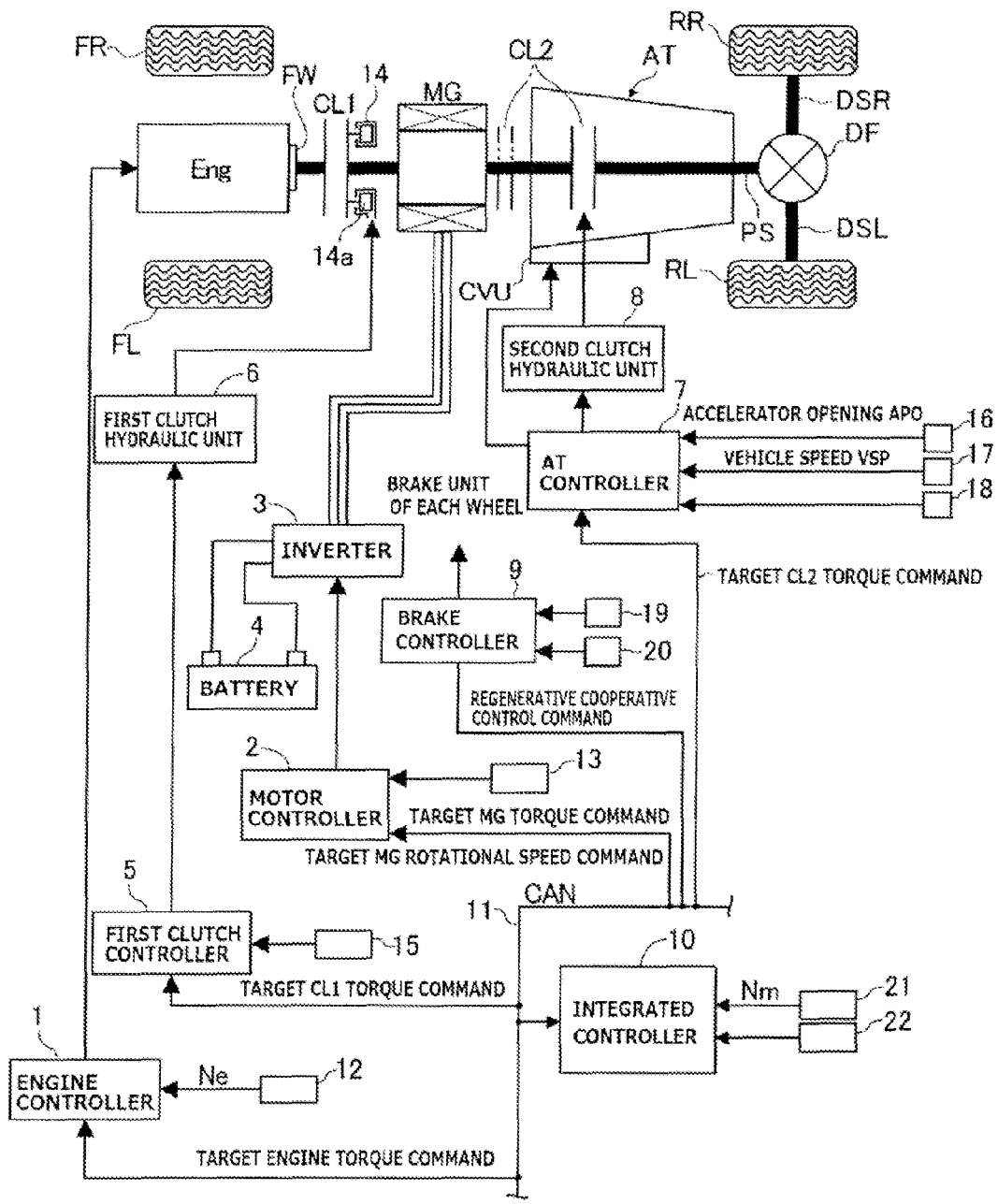
FIG. 1 is a powertrain system configuration diagram showing a powertrain system of a hybrid vehicle to which a hybrid vehicle control apparatus according to a first embodiment is applied.

The following describes the best form for carrying out a hybrid vehicle driving torque control apparatus according to the present invention, with reference to a first embodiment shown in the drawings.

First Embodiment

First, the following describes configuration of a hybrid vehicle control apparatus according to the first embodiment separately in [Powertrain System Configuration], [Control System Configuration], [Integrated Controller Configuration], and [Operation Configuration of Engine Start Control Calculation].

[Powertrain System Configuration] First, the following describes configuration of a powertrain system of a hybrid vehicle according to the first embodiment. FIG. 1 is a whole system diagram showing the hybrid vehicle of the first embodiment based on rear wheel drive, to which a driving torque control apparatus of the hybrid vehicle is applied.

As shown in FIG. 1, the hybrid vehicle of the first embodiment includes a driveline which includes an engine "Eng", a flywheel "FW", a first clutch CL1, a motor generator "MG", a second clutch CL2, an automatic transmission "AT", a propeller shaft "PS", a differential gear "DF", a left drive shaft "DSL", a right drive shaft "DSR", a left rear wheel "RL" (driving wheel), a right rear wheel "RR" (driving wheel), a left front wheel "FL", and a right front wheel "FR".

Engine Eng is a gasoline engine or diesel engine, which is controlled based on an engine control command from an engine controller 1 so that an engine start control, an engine stop control, and a throttle valve opening control are performed. Flywheel FW is attached to an output shaft of the engine.

First clutch CL1 is arranged between engine Eng and motor generator MG, and is controlled to be engaged or disengaged (or half-engaged) by a first clutch control hydraulic pressure that is produced by a first clutch hydraulic unit 6 based on a first clutch control command from a first clutch controller 5. For example, first clutch CL1 is implemented by a dry type single plate clutch whose engagement and disengagement are controlled by a hydraulic actuator 14 including a piston 14a.

Motor generator MG is a synchronous motor generator in which a permanent magnet is embedded in a rotor and a stator coil is wounded around a stator. Motor generator MG is controlled based on a control command from a motor controller 2 so that three phase alternating currents are generated and applied to motor generator MG by an inverter 3. Motor generator MG can function as an electric motor that rotates based on power supply from a battery 4 (this state henceforth called "power running"), and function also as an electric generator to charge battery 4 by generating an electromotive force between ends of the stator coil when the rotor receives a rotational energy from engine Eng and the driving wheels (this operating state henceforth called "regeneration"). The rotor of motor generator MG is coupled to a transmission input shaft of automatic transmission AT through a damper.

Second clutch CL2 is arranged between motor generator MG and left and right rear wheels RL, RR. Second clutch CL2 is controlled to be engaged or disengaged (including "slip-engaged" and "slip-disengaged") by a control hydraulic pressure that is produced by a second clutch hydraulic unit 8 based on a second clutch control command from an AT controller 7. For example, second clutch CL2 is implemented by a wet type multiplate clutch or brake, wherein the flow rate and hydraulic pressure of working fluid can be controlled continuously by a proportional solenoid valve. First clutch hydraulic unit 6 and second clutch hydraulic unit 8 are installed in an AT hydraulic pressure control valve unit "CVU" that is provided with automatic transmission AT.

Automatic transmission AT is a stepwise variable transmission which automatically shifts among a plurality of stepwise gear positions such as five forward gear positions and one reverse gear position, depending on vehicle speed, accelerator opening, etc. Accordingly, second clutch CL2 is not a newly added special clutch, but is a suitably selected one of clutches and brakes among a plurality of friction engagement elements configured to be engaged in each gear position in a torque transmission path in automatic transmission AT. Alternatively, second clutch CL2 may be a special clutch disposed between motor generator MG and automatic transmission AT or between automatic transmission AT and the driving wheels (left and right rear wheels RL, RR) as indicated by a two-dot chain line in FIG. 1, not one of the friction engagement elements of automatic transmission AT.

An output shaft of automatic transmission AT is coupled to left and right rear wheels RL, RR through propeller shaft PS, differential gear DF, left drive shaft DSL, and right drive shaft DSR.

[Control System Configuration] The following describes a control system of the hybrid vehicle. As shown in FIG. 1, the control system of the hybrid vehicle according to the first embodiment includes engine controller 1, motor controller 2, inverter 3, battery 4, first clutch controller 5, first clutch hydraulic unit 6, AT controller 7, second clutch hydraulic unit 8, a brake controller 9, and an integrated controller 10. Engine controller 1, motor controller 2, first clutch controller 5, AT controller 7, brake controller 9, and integrated controller 10 are connected through a CAN communication line 11 for exchanging information with each other.

Engine controller 1 receives input of information about engine rotational speed from an engine rotational speed sensor 12, and input of a target engine torque command from integrated controller 10, and input of other necessary information. Engine controller 1 outputs a command for controlling an engine operating point (Ne, Te), to a throttle valve actuator of engine Eng and others.

Motor controller 2 receives input of information from a resolver 13 that senses a rotor angular position of motor generator MG, and input of a target MG torque command and a target MG rotational speed command from integrated controller 10, and input of other necessary information. Motor controller 2 outputs to inverter 3 a command for controlling a motor operating point (Nm, Tm) of motor generator MG. Motor controller 2 monitors the battery SOC indicating the state of charging of battery 4, and provides the battery SOC information to integrated controller 10 through CAN communication line 11, wherein the battery SOC information is used also as control information about motor generator MG.

First clutch controller 5 receives input of sensor information from a first clutch stroke sensor 15 that senses the stroke position of piston 14a of hydraulic actuator 14, and input of a target CL1 torque command from integrated controller 10, and input of other necessary information. First clutch controller 5 outputs a command for controlling engagement and disengagement of first clutch CL1, to first clutch hydraulic unit 6 in AT hydraulic pressure control valve unit CVU.

AT controller 7 receives input of information from an accelerator opening sensor 15, a vehicle speed sensor 17, other sensors, etc. (a transmission input rotational speed sensor, an inhibitor switch, etc.) 18. When the vehicle is running with a D range selected, an optimal gear position is found based on the position of an operating point in a shift map, wherein the operating point is defined by an accelerator opening APO and a vehicle speed VSP, and a control command for obtaining the found gear position is outputted to AT hydraulic pressure control valve unit CVU. In addition to this automatic shift control, if the target CL2 torque command is inputted from integrated controller 10, a second clutch control is performed to output a command for controlling engagement and disengagement of second clutch CL2, to second clutch hydraulic unit 8 in AT hydraulic pressure control valve unit CVU. The shift map is a map where upshift lines and downshift lines are drawn with respect to accelerator opening APO and vehicle speed VSP as shown as an example in FIG. 8.

Brake controller 9 receives input of sensor information from a wheel speed sensor 19 for measuring the wheel speed of each of the four wheels, and a brake stroke sensor 20, and input of a cooperative regeneration control command from integrated controller 10, and input of other necessary information. For example, when a brake pedal is depressed for braking and a requested braking force calculated from a brake stroke BS is not satisfied only by a regenerative braking force, brake controller 9 performs a cooperative regenerative braking control for covering the shortage with a mechanical braking force (hydraulic braking force or motor braking force).

Integrated controller 10 manages consumed energy of the whole vehicle, and functions to allow the vehicle to travel at an optimized efficiency. Integrated controller 10 receives input of necessary information from a motor rotational speed sensor 21 for measuring motor rotational speed Nm, and other sensors, switches, etc. 22, and input of information through CAN communication line 11. Integrated controller 10 outputs a target engine torque command to engine controller 1, a target MG torque command and a target MG rotational speed command to motor controller 2, a target CL1 torque command to first clutch controller 5, a target CL2 torque command to AT controller 7, and a cooperative regenerative control command to brake controller 9.

Figure 2:
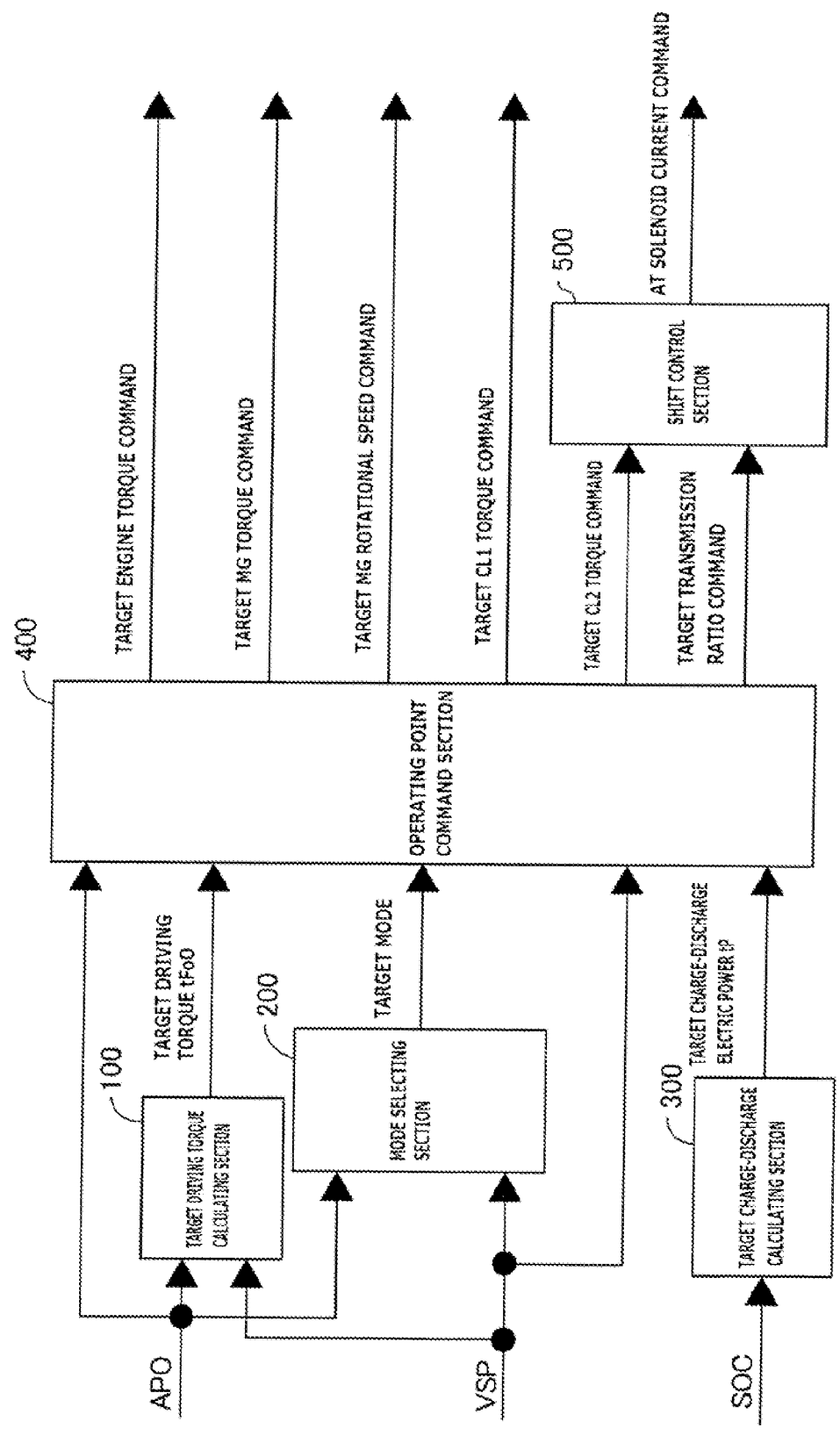
FIG. 2 is a control block diagram showing a calculation operation performed by an integrated controller of the hybrid vehicle control apparatus according to the first embodiment.
Figure 3:
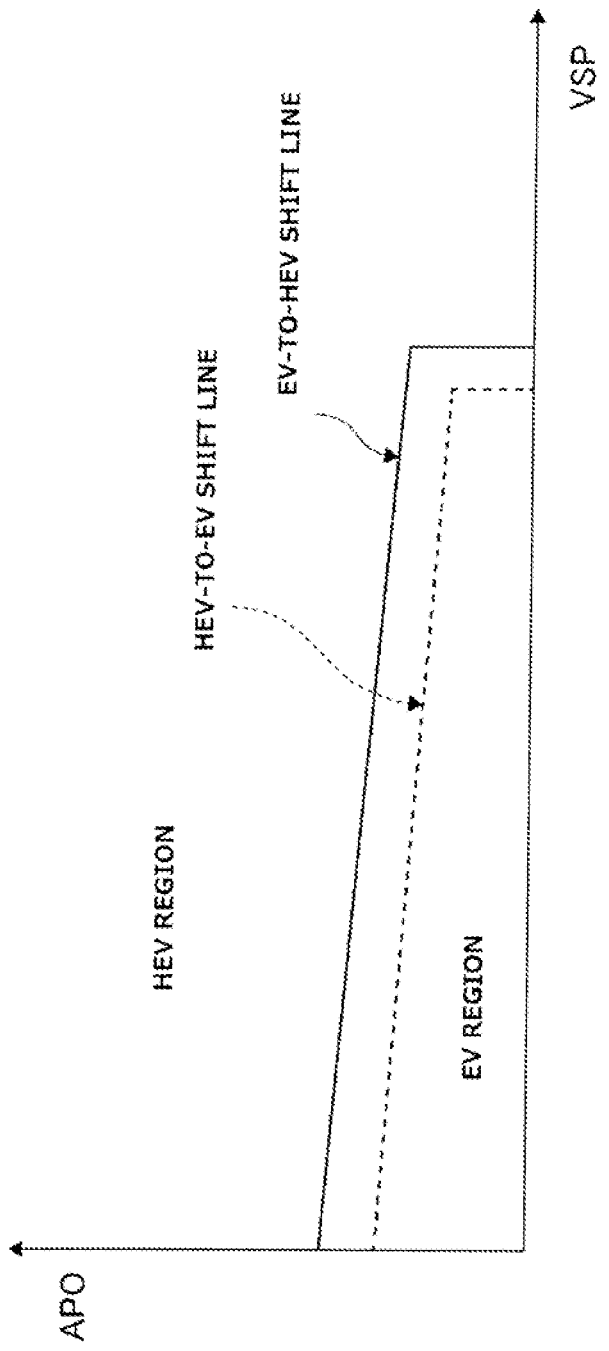
FIG. 3 is a diagram showing an EV-HEV selection map used when a mode selection operation is performed by the integrated controller of the hybrid vehicle control apparatus according to the first embodiment.

FIG. 2 is a control block diagram showing a calculation operation performed by integrated controller 10 of the hybrid vehicle to which the hybrid vehicle control apparatus according to the first embodiment is applied. FIG. 3 is a diagram showing an EV-HEV selection map used when a mode selection operation is performed by integrated controller 10 of the hybrid vehicle. The following describes the calculation operation performed by integrated controller 10 according to the first embodiment with reference to FIGS. 2 and 3.

Figure 4A:
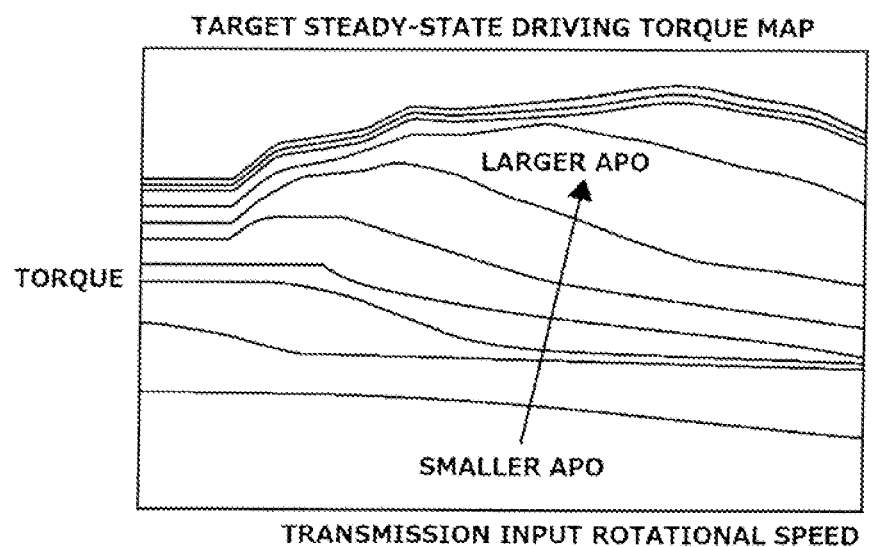
FIG. 4A is a map diagram showing a steady-state target torque map used by the integrated controller of the hybrid vehicle control apparatus according to the first embodiment.
Figure 4B:
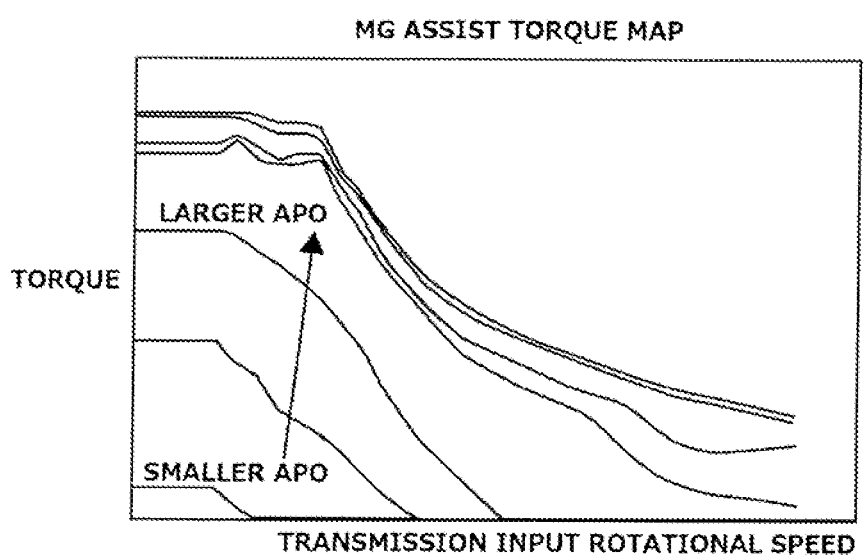
FIG. 4B is a map diagram showing an MG assist driving force map used by the integrated controller of the hybrid vehicle control apparatus according to the first embodiment.

As shown in FIG. 2, integrated controller 10 includes a target driving torque calculating section 100, a mode selecting section 200, a target charge-discharge calculating section 300, and an operating point command section 400. Target driving torque calculating section 100 calculates a target steady-state driving torque and an MG assist torque based on accelerator opening APO and the transmission input rotational speed corresponding to vehicle speed VSP, by using a target steady-state driving torque map shown in FIG. 4A and an MG assist torque map shown in FIG. 4B.

Mode selecting section 200 selects one of "EV drive mode" and "HEV drive mode" as a target drive mode by using an engine start/stop line map shown in FIG. 5 which is set by accelerator opening APO with respect to vehicle speed. The engine start line and the engine stop line become lower in the direction of decrease of accelerator opening as the battery SOC decreases.

Figure 7:
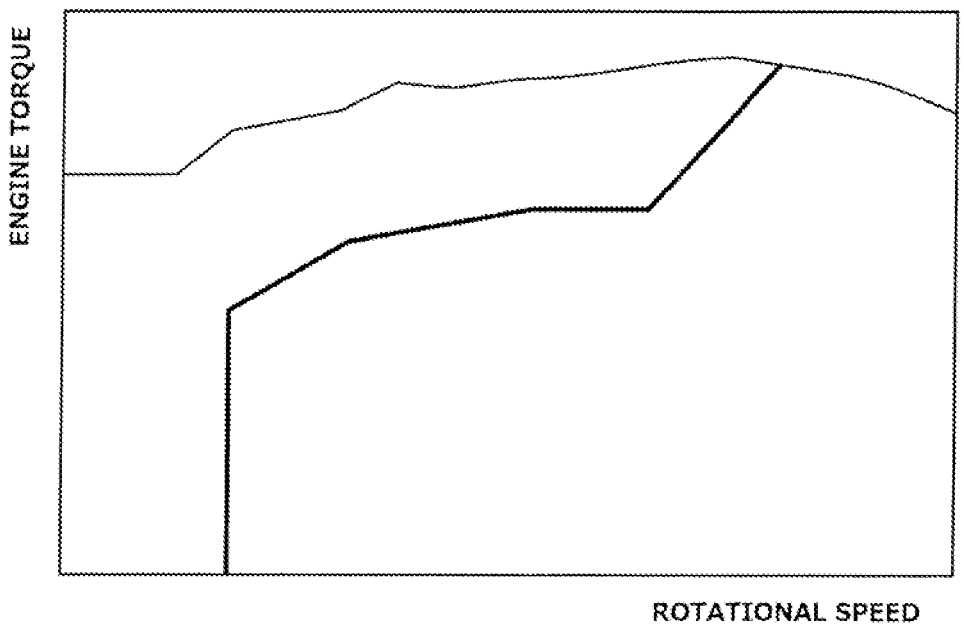
FIG. 7 is a characteristic diagram showing an optimal engine fuel efficiency line used by the hybrid vehicle control apparatus according to the first embodiment.

Target charge-discharge calculating section 300 calculates a target generation output based on the battery SOC by using a running-condition requested generation output map shown in FIG. 6. Moreover, target charge-discharge calculating section 300 calculates an output required to increase the engine torque from a current operating point up to an optimal fuel efficiency line indicated by a bold line in FIG. 7, and compares the required output with the target generation output, and adds the smaller of the required output and the target generation output as a requested output to the engine output.

Operating point command section 400 calculates a transient target engine torque, a transient target MG torque, a transient target MG rotational speed, a transient target CL1 torque, a transient target CL2 torque, and a transient target transmission ratio, as a target of operating point, based on accelerator opening APO, target driving torque tFoO, MG assist torque, target mode, vehicle speed VSP, and target charge-discharge electric power (requested generation output) tP. The calculation result is outputted to controllers 1, 2, 5 and 7 via CAN communication line 11.

Moreover, operating point command section 400 performs an engine start operation. Mode selecting section 200 performs mode shifting from the EV drive mode to the HEV drive mode with engine starting, when the operating point defined by the combination of accelerator opening APO and vehicle speed VSP enters an HEV region across the EV to HEV shift line during EV driving. Furthermore, mode selecting section 200 performs driving mode shifting from the HEV drive mode to the EV drive mode with engine stopping and separation, when the operating point enters an EV region across the HEV to EV shift line during HEV driving.

In response to the driving mode shifting, operating point command section 400 performs the start operation at a time instant when accelerator opening APO exceeds the engine start line shown in FIG. 5 during the EV drive mode. The start operation is implemented by controlling the torque capacity of second clutch CL2 to allow the second clutch CL2 to slip in half-engaged state, and judges that second clutch CL2 starts to slip, and thereafter increase the engine rotational speed by starting engagement of first clutch CL1. Then, as the engine rotational speed reaches a rotational speed allowing initial explosion, operating point command section 400 activates engine Eng, and completely engages first clutch CL1 in response to a condition that the motor rotational speed becomes close to the engine rotational speed, and thereafter locks up second clutch CL2, thereby shifting into the HEV drive mode.

Figure 8:
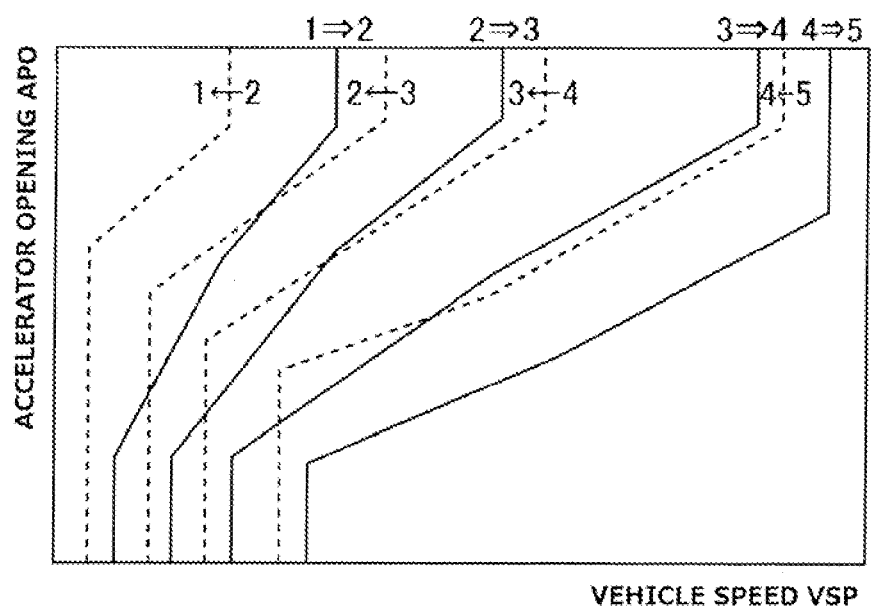
FIG. 8 is a shift map diagram showing an example of shift lines in an automatic transmission used by the hybrid vehicle control apparatus according to the first embodiment.

A shift control section 500 controls solenoid valves in automatic transmission AT to be driven for achieving the target CL2 torque capacity and the target transmission ratio. FIG. 8 shows shift lines. Shift control section 500 determines a target gear position from the current gear position, based on vehicle speed VSP and accelerator opening APO, and controls shift clutches for a gearshift if a gearshift request is present.

Figure 9:
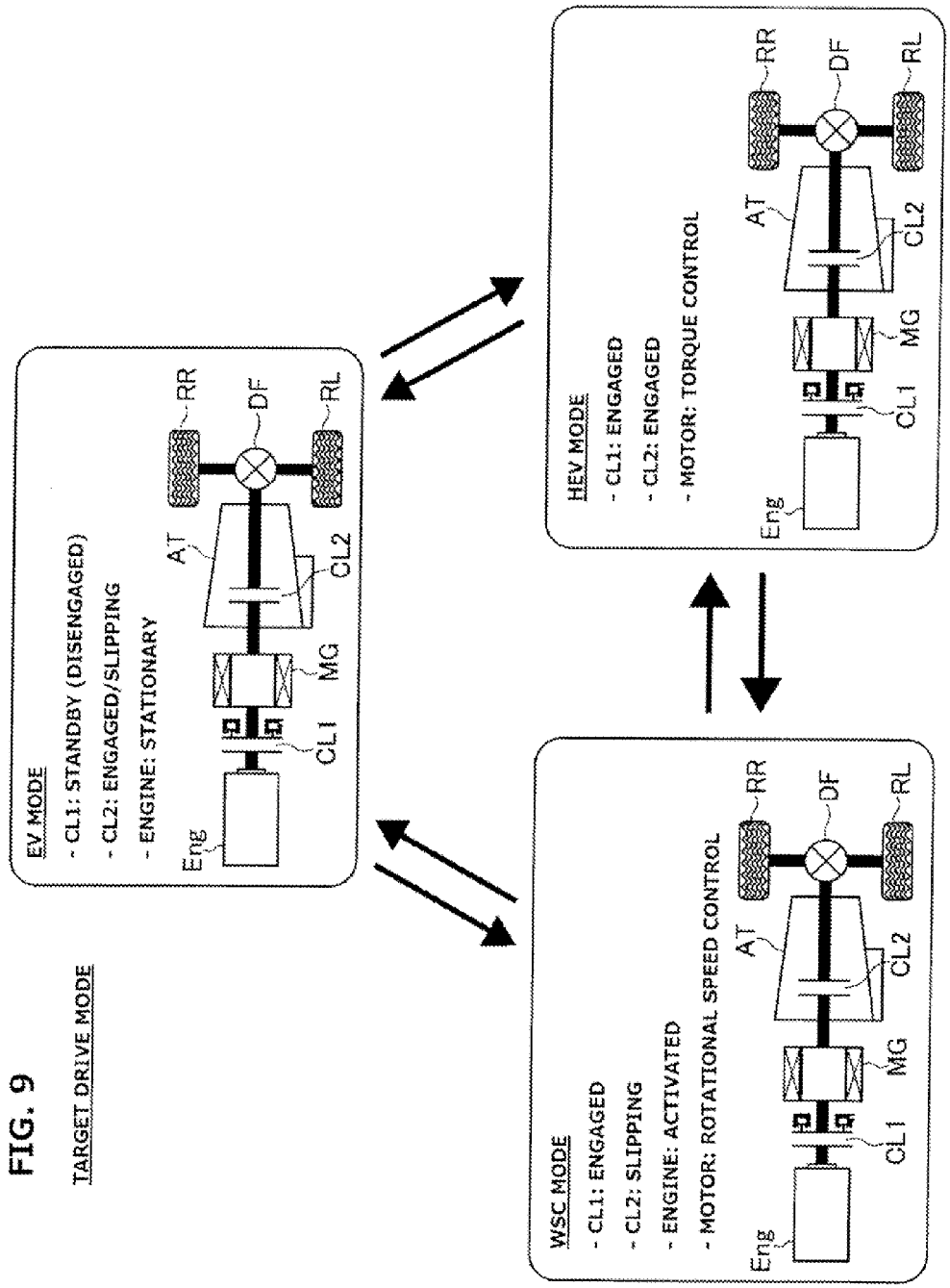
FIG. 9 is a target drive mode diagram showing an example of target drive mode transition in the hybrid vehicle control apparatus according to the first embodiment.

Integrated controller 10 including the configuration described above sets a WSC mode as a drive mode in addition to the EV mode and the HEV mode as shown in FIG. 9, wherein the WSC mode is set in a transient period of drive mode shifting therebetween. The EV mode is a mode where the vehicle is driven only by power of motor generator MG. In the EV mode, engine Eng is maintained at rest, and first clutch CL1 is disengaged, and second clutch CL2 is engaged or slip-engaged to transmit only output rotation from motor generator MG to left and right rear wheels RL, RR through automatic transmission AT. The HEV mode is a mode where the vehicle is driven by power of engine Eng and motor generator MG. In the HEV mode, second clutch CL2 and first clutch CL1 are engaged to transmit output rotation from engine Eng and output rotation from motor generator MG to left and right rear wheels RL, RR through automatic transmission AT. The WSC mode is a mode where the vehicle is started with clutch torque capacity control, at N to D selecting start from the HEV mode, or at D range start from the EV mode or the HEV mode. In this mode, the vehicle is started, while second clutch CL2 is maintained in slip-engaged state by rotational speed control of motor generator MG, and the clutch transmitted torque through second clutch CL2 is controlled to conform to a requested driving torque that is determined by vehicle condition and driver's operation. In this situation, since second clutch CL2 is in slip-engaged state, it is possible to absorb a mode shifting shock, and thereby serve for shock suppression. "WSC" is an abbreviation for "Wet Start Clutch".

Figure 10:
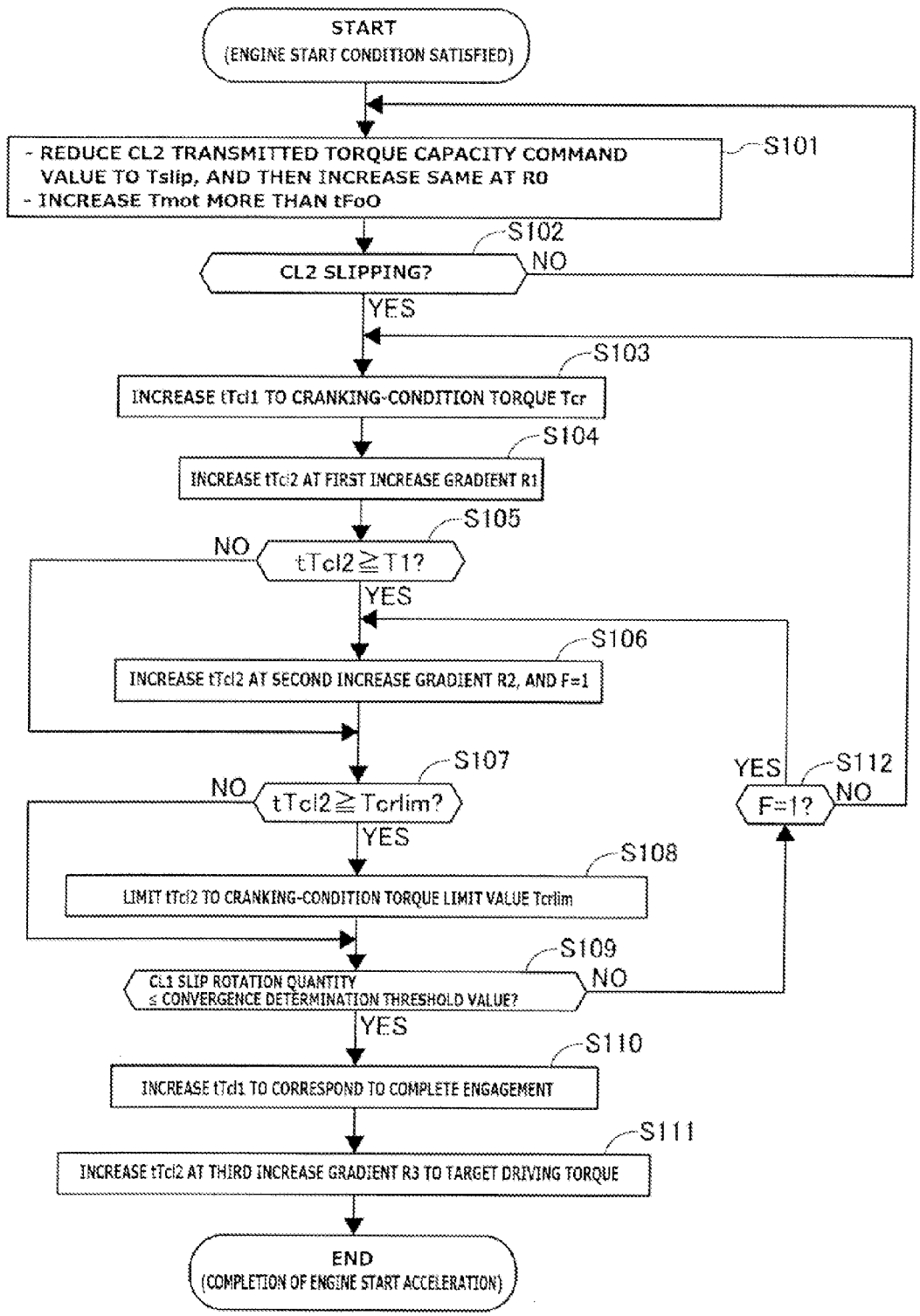
FIG. 10 is a flow chart showing a flow of engine start control operation in the hybrid vehicle control apparatus according to the first embodiment.

[Operation Configuration of Engine Start Control] FIG. 10 shows a flow of engine start control operation performed by a part of integrated controller 10 as an engine start control part, during shifting from the EV mode to the HEV mode as described above.

The engine start control is started at a time instant when accelerator opening APO and vehicle speed VSP cross the engine start line shown in FIG. 5, as described above. First, at Step S101, integrated controller 10 reduces a second clutch transmitted torque capacity command value tTcl2 to a slip-control-condition value Tslip, and thereafter increases the second clutch transmitted torque capacity command value tTcl2 at a slip-in control condition CL2 command gradient R0 (see FIG. 13). Simultaneously, integrated controller 10 increases motor torque Tmot more than target driving torque tFoO (target steady-state driving torque), wherein motor torque Tmot is the output torque of motor generator MG, and then proceeds to Step S102.

At Step S102, integrated controller 10 judges whether second clutch CL2 is slipping, and when second clutch CL2 is not slipping, returns to Step S101, and when second clutch CL2 is slipping, proceeds to Step S103. This judgment about slipping state is based on the difference between motor rotational speed Nm and the product of the output rotational speed of automatic transmission AT and the gear ratio Nout.

At Step S103 to which integrated controller 10 proceeds when second clutch CL2 is slipping, integrated controller 10 increases a first clutch transmitted torque capacity command value tTcl1 to a predetermined cranking-condition torque Tcr for transmitting a starting torque from motor generator MG to engine Eng, and then proceeds to Step S104. Cranking-condition torque Tcr is set to a value within a range expressed by the following equation, for maintaining second clutch CL2 stably in slip state.

$$Tcl1\min < Tcr < Tm\max - tTcl2 = Tm\max - tTi$$

Tcl1min is an engine friction value before engine ignition, and is set to zero after engine ignition. Tmmax is a maximum torque of motor generator MG. tTcl2 is a transmitted torque capacity command value of second clutch CL2. tTi is a target transmission input torque, and is set to target driving torque tFoO.

At Step S104, integrated controller 10 increases second clutch transmitted torque capacity command value tTcl2 as the second clutch transmitted torque capacity at a first increase gradient R1, and then proceeds to Step S105. First increase gradient R1, and a second increase gradient R2 and a third increase gradient R3 which are described below are set based on a setting map stored in an increase gradient setting part 400c of an engine start control part 400a shown in FIG. 12 included in operating point command section 400 (see FIG. 2). Specifically, each increase gradient R1, R2, R3 is set based on the setting map of each increase gradient R1, R2, R3 shown in FIG. 11A in a manner that each increase gradient R1, R2, R3 increases as accelerator opening APO increases. Each increase gradient R1, R2, R3 is set as R2<R1<R3. Each increase gradient R1, R2, R3 is set for each gear position of automatic transmission AT such that each increase gradient R1, R2, R3 increases as the gear position becomes higher. Moreover, as described below, first increase gradient R1 and second increase gradient R2 are set so as to allow the second clutch transmitted torque capacity to reach cranking-condition torque limit value Tcrlim at the timing when first clutch CL1 is engaged in response to completion of cranking of engine Eng.

Referring back to FIG. 10, at Step S105, integrated controller 10 determines whether or not second clutch transmitted torque capacity command value tTcl2 becomes greater than or equal to a gradient shift threshold value T1, and when it is affirmative, proceeds to Step S106, and when it is negative, proceeds to Step S107.

At Step S106 to which integrated controller 10 proceeds when second clutch transmitted torque capacity command value tTcl2 becomes greater than or equal to gradient shift threshold value T1, integrated controller 10 increases second clutch transmitted torque capacity command value tTcl2 at second increase gradient R2, and then proceeds to Step S107. At Step S106, second clutch transmitted torque capacity command value tTcl2 is increased at second increase gradient R2 that is slower than first increase gradient R1.

Moreover, at Step S106, a second increase gradient flag F is set to 1, wherein second increase gradient flag F is initially equal to zero. At the foregoing Steps S102 to S106, after second clutch CL2 starts to slip, second clutch transmitted torque capacity command value tTcl2 is increased at first increase gradient R1, and when gradient shift threshold value T1 is reached thereafter, is increased at second increase gradient R2.

Figure 11A:
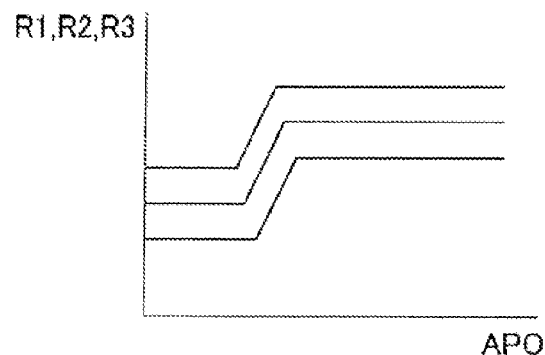
FIG. 11A is a diagram showing a map for setting an increase gradient in the hybrid vehicle control apparatus according to the first embodiment.
Figure 11B:
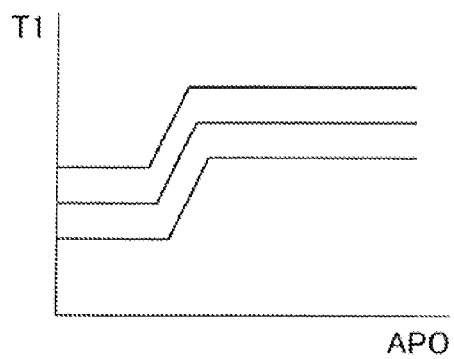
FIG. 11B is a diagram showing a map for setting an increase gradient shift threshold value in the hybrid vehicle control apparatus according to the first embodiment.
Figure 12:
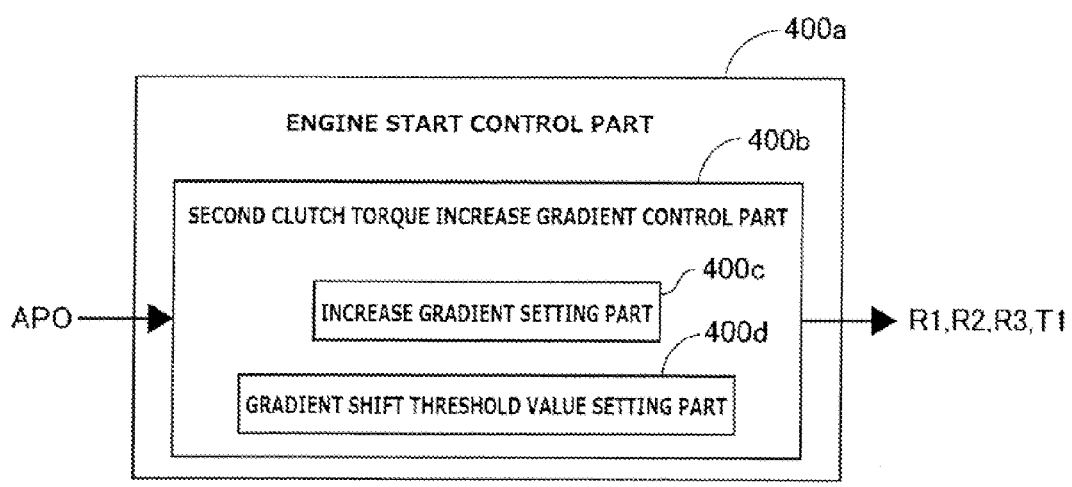
FIG. 12 is a block diagram showing a major part of the integrated controller of the hybrid vehicle control apparatus according to the first embodiment.

Gradient shift threshold value T1 is set by a gradient shift threshold value setting part 400d shown in FIG. 12, based on a setting map shown in FIG. 11B, in a manner that gradient shift threshold value T1 increases as accelerator opening APO increases. Additionally, gradient shift threshold value T1 is set to a value greater than cranking-condition torque limit value Tcrlim described below, when accelerator opening APO is greater than or equal to a predetermined value corresponding to rapid acceleration.

At Step S107 to which integrated controller 10 proceeds after second clutch transmitted torque capacity command value tTcl2 is increased at second increase gradient R2, integrated controller 10 determines whether or not second clutch transmitted torque capacity command value tTcl2 is greater than or equal to cranking-condition torque limit value Tcrlim. When it is negative, integrated controller 10 proceeds to Step S109. On the other hand, when it is affirmative, integrated controller 10 proceeds to Step S108. This cranking-condition torque limit value Tcrlim is calculated by the following equation (1).

$$Tcrlim = Tmot\max - tTcl1 - [\text{clutch variation quantity}] \quad (1)$$

Tmotmax is a motor torque upper limit value. tTcl1 is a first clutch transmitted torque capacity command value. The clutch variation quantity is of clutches CL1, CL2.

At Step S108 to which integrated controller 10 proceeds under the condition of second clutch transmitted torque capacity command value tTcl2≥cranking-condition torque limit value Tcrlim at Step S107, integrated controller 10 limits second clutch transmitted torque capacity command value tTcl2 to cranking-condition torque limit value Tcrlim, and then proceeds to Step S109.

Next, at Step S109, integrated controller 10 determines whether or not the slip rotation quantity of first clutch CL1 is smaller than or equal to a convergence determination threshold value, and when it is negative, proceeds to Step S112, and when it is affirmative, proceeds to Step S110. The convergence determination threshold value is a value for determining that engine Eng is started, which indicates that the difference between engine rotational speed Ne and the product of the output rotational speed of automatic transmission AT and the gear ratio Nout becomes smaller than the set value so that engine rotational speed Ne and the product of the output rotational speed of automatic transmission AT and the gear ratio Nout are substantially equal to each other.

At Step S112 to which integrated controller 10 proceeds when the slip rotation quantity of first clutch CL1 is greater than the convergence determination threshold value at Step S109, integrated controller 10 determines whether or not second increase gradient flag F is equal to 1, and when it is affirmative, returns to Step S106, and when it is negative, returns to Step S103.

At Step S110 to which integrated controller 10 proceeds when the slip rotation quantity of first clutch CL1 becomes smaller than or equal to the convergence determination threshold value, integrated controller 10 increases first clutch transmitted torque capacity command value tTcl1 to correspond to complete engagement, and then proceeds to Step S111. At Step S111, integrated controller 10 increases second clutch transmitted torque capacity command value tTcl2 to target driving torque tFoO at third increase gradient R3, and then terminates the start operation.

As described above, when second clutch transmitted torque capacity command value tTcl2 is increased at first increase gradient R1, and is made to reach gradient shift threshold value T1 based on the setting of gradient shift threshold value T1, second clutch transmitted torque capacity command value tTcl2 is thereafter increased at second increase gradient R2. Furthermore, when second clutch transmitted torque capacity command value tTcl2 is increased at first increase gradient R1, and reaches cranking-condition torque limit value Tcrlim before reaching gradient shift threshold value T1 (in the case of T1>Tcrlim), the second clutch transmitted torque capacity command value tTcl2 is limited to cranking-condition torque limit value Tcrlim.

On the other hand, in the situation where second clutch transmitted torque capacity command value tTcl2 reaches gradient shift threshold value T1 and is thereafter increased at second increase gradient R2, second clutch transmitted torque capacity command value tTcl2 is limited by cranking-condition torque limit value Tcrlim when reaching cranking-condition torque limit value Tcrlim. When the slip quantity of first clutch CL1 becomes smaller than or equal to the convergence determination value before second clutch transmitted torque capacity command value tTcl2 reaches cranking-condition torque limit value Tcrlim, second clutch transmitted torque capacity command value tTcl2 is increased at third increase gradient R3.

Operation of First Embodiment

Figure 13:
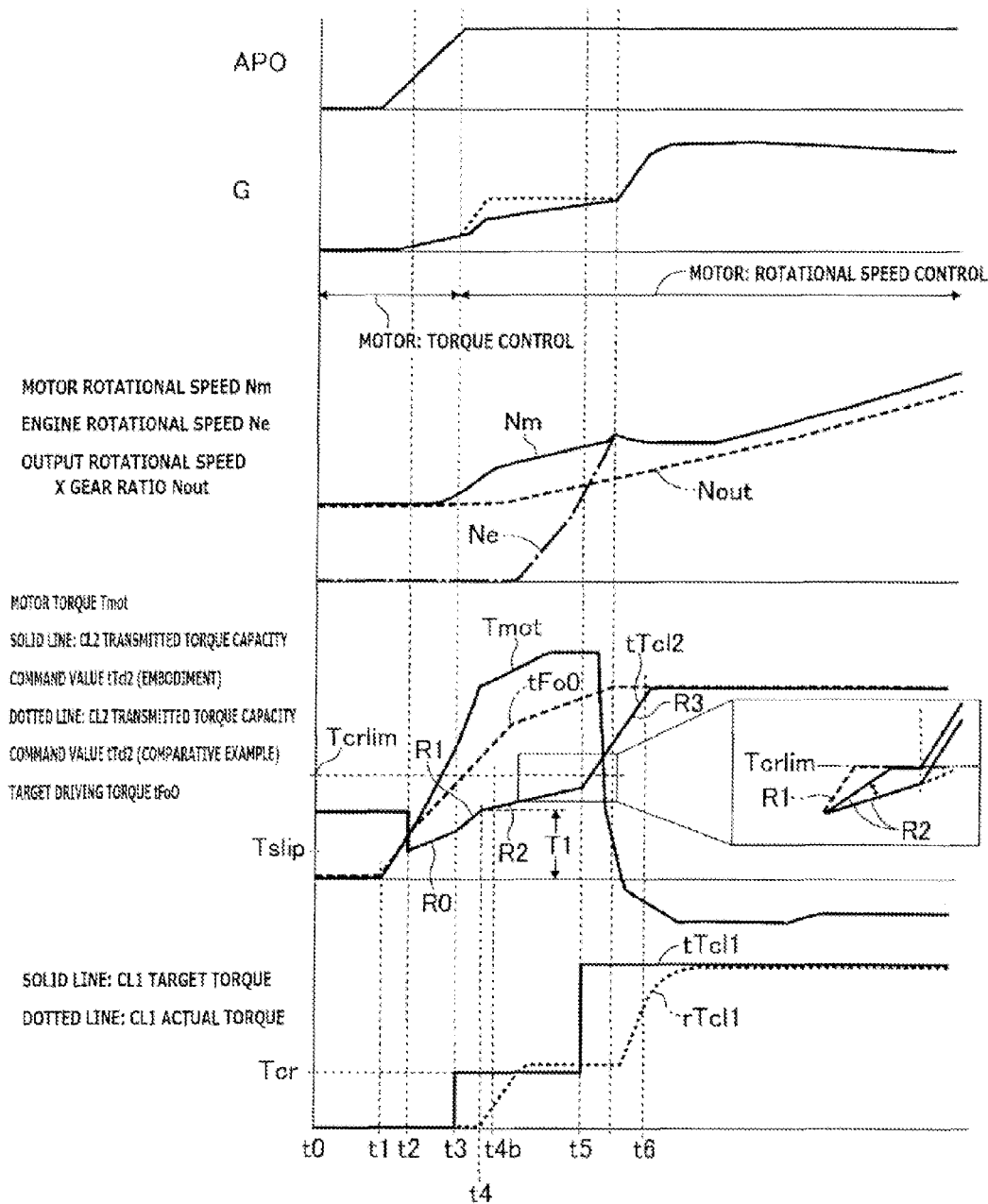
FIG. 13 is a time chart showing an example of operation when engine start control is performed, in the case of the hybrid vehicle control apparatus according to the first embodiment, and in a comparative example.

The following describes operation of the first embodiment with reference to an example of operation shown in the time chart of FIG. 13. The example of operation is in a situation where the vehicle is coasting with the accelerator opening equal to zero in the EV mode, and then a driver performs an acceleration operation by depressing the accelerator pedal so that the vehicle shifts into the HEV mode.

In FIG. 1, a time instant t0, the vehicle is coasting with the accelerator opening equal to zero in the EV mode as described above. In this situation, depression of the accelerator pedal is started at a time instant t1 so that accelerator opening APO starts to increase, and is thereafter maintained constant at a value at about a time instant t3.

In the situation where such accelerator pedal operation (acceleration operation) is performed, engine start judgement is done at time instant t2. This is done at the event that accelerator opening APO and vehicle speed VSP cross the engine start line (see FIG. 5). When the engine start judgement is done, the engine start control shown in FIG. 10 is performed so that first, motor torque Tmot that is the driving torque of motor generator MG is increased with second clutch CL2 slipped. In this situation, second clutch transmitted torque capacity command value tTcl2 as the second clutch transmitted torque capacity is first reduced to slip-control-condition value Tslip, and thereafter is increased at slip-in control condition CL2 command gradient R0 (Step S101).

Then, at time instant t3 when it is determined that second clutch CL2 is slipping, rotational speed control is performed for motor generator MG, and first clutch CL1 is slip-engaged, and thereby the motor rotation is inputted to engine Eng, to stat cranking (Step S102 to Step S103). Thereafter, second clutch CL2 is maintained in slip state, and the engine rotational speed increases to a predetermined rotational speed, and the engine start is confirmed, and clutches CL1, CL2 are engaged. Problems in this situation are described with reference to a comparative example.

Problem(s) to be Solved in Comparative Example

While engine Eng is being cranked, the transmitted torque capacity of second clutch CL2 is set to cranking-condition torque limit value Tcrlim, to maintain second clutch CL2 in slip state, and prevent rotational fluctuation of engine Eng from being transmitted to the driving wheel side. Specifically, in FIG. 13, during a period from time instant t3 to time instant t5, the transmitted torque capacity of second clutch CL2 is limited not to exceed the cranking-condition torque limit value Tcrlim, thereby maintaining the slip state.

In this situation, according to the comparative example, after time instant t3 when first clutch CL1 starts us to be slip-engaged, second clutch transmitted torque capacity command value tTcl2 is increased at a constant gradient corresponding to target driving torque tFoO, as indicated by a dotted line in FIG. 13. In this situation, second clutch transmitted torque capacity command value tTcl2 reaches cranking condition torque limit value Tcrlim early as indicated by the dotted line in FIG. 13 (t4b), and thereafter is maintained in the state limited to cranking-condition torque limit value Tcrlim. Accordingly, vehicle longitudinal acceleration G is maintained constant during a period from the proximity of time instant t4 to a time instant after time instant t5, thereby causing a delay of acceleration, as indicated by a dotted line in FIG. 13.

Operation of First Embodiment

First, the following describes a situation where acceleration operation except rapid acceleration is performed in the first embodiment. According to the first embodiment, at time instant t3 when second clutch CL2 starts to be slipped, second clutch transmitted torque capacity command value tTcl2 is first increased at first increase gradient R1 corresponding to accelerator opening APO (Step S102 to Step S104). Thereafter, after time instant t4 when second clutch transmitted torque capacity command value tTcl2 reaches gradient shift threshold value T1, second clutch transmitted torque capacity command value tTcl2 is increased at second increase gradient R2 (operation of Step S105 to Step S106). Second increase gradient R2 is set slower than first increase gradient R1. First increase gradient R1 and second increase gradient R2 are set so as to allow the cranking-condition torque limit value Tcrlim to be reached at the timing when first clutch CL1 is engaged in response to completion of cranking of engine Eng. This serves to minimize the period when second clutch transmitted torque capacity command value tTcl2 is limited to cranking-condition torque limit value Tcrlim while engine Eng is being cranked. Specifically, as shown in an enlarged part of FIG. 13, although the timing when second clutch transmitted torque capacity command value tTcl2 reaches cranking-condition torque limit value Tcrlim varies to some extent depending on accelerator opening APO, it is possible to shorten the period when second clutch transmitted torque capacity command value tTcl2 is limited to cranking-condition torque limit value Tcrlim. This makes it possible to suppress the delay of acceleration resulting from the condition that second clutch transmitted torque capacity command value tTcl2 is maintained at cranking-condition torque limit value Tcrlim to make the vehicle longitudinal acceleration constant.

Thereafter, at time instant t5 when engine rotational speed Ne has risen and the slip rotation quantity of first clutch CL1 becomes smaller than or equal to the convergence determination threshold value, first clutch CL1 is controlled toward complete engagement, and second clutch transmitted torque capacity command value tTcl2 is increased to target driving torque tFoO at third increase gradient R3.

The following describes a condition of rapid acceleration. Under the condition of rapid acceleration where accelerator opening APO is larger than the set value, gradient shift threshold value T1 is set greater than cranking-condition torque limit value Tcrlim. In this situation, Steps S103, S104, S105, S107, S109, S112, and S103 are repeated in this order, so that second clutch transmitted torque capacity command value tTcl2 is increased constantly at first increase gradient R1 (see a dotted line in the enlarged part of FIG. 13). Then, when second clutch transmitted torque capacity command value tTcl2 reaches cranking-condition torque limit value Tcrlim, second clutch transmitted torque capacity command value tTcl2 is limited to cranking-condition torque limit value Tcrlim (Step S107 to Step S108). In this situation, the operation is the same as in the comparative example. However, when the driver depresses the accelerator pedal hard to perform rapid acceleration, the period of limitation by cranking-condition torque limit value Tcrlim is short, and acceleration shock is large, and thereby acceleration is not delayed.

Effects of First Embodiment

The following describes effects of the first embodiment.
<a> A hybrid vehicle control apparatus according to the first embodiment includes: an engine Eng and a motor generator MG provided as drive sources of a vehicle; first and second clutches CL1, CL2 disposed in a driveline from the drive sources to left and right rear wheels RL, RR as driving wheels, wherein the first clutch CL1 is disposed between the engine Eng and the motor generator MG, and configured to vary a transmitted torque therebetween, and wherein the second clutch CL2 is disposed between the motor generator MG and the left and right rear wheels RL, RR, and configured to vary a transmitted torque therebetween; an engine start control part 400a configured to start the engine Eng (Step S101) by bringing the first clutch CL1 into slip-engaged state (Step S103), and allowing the second clutch to slip, and increasing a driving torque of the motor generator MG, in response to a determination by operating point command section 400 as an engine start request determination means that an engine start request is present in an EV mode, wherein the determination is based on a running state and an operating state of the vehicle, and wherein the EV mode allows driving by the driving torque of the motor generator MG with the first clutch CL1 disengaged and the second clutch CL2 engaged; the engine start control part 400a being configured to perform: a slip start operation (S101) to cause the second clutch CL2 to slip; a cranking operation (Steps S104 to S108) to crank the engine Eng by bringing the first clutch CL1 into slip-engaged state, and maintaining the second clutch CL2 in slipping state by setting second clutch transmitted torque capacity command value tTcl2 as transmitted torque capacity of the second clutch smaller than or equal to a set cranking-condition torque limit value Tcrlim; and a clutch engagement operation (S109 to S111) to control the first clutch CL1 and the second clutch CL2 into completely engaged state in response to a condition that the engine Eng is in driving state; and a second clutch torque increase gradient control part 400*b* included in the engine start control part 400*a*, and configured to perform the following while the cranking operation is being performed: a first increase operation (Step S104) to increase the second clutch transmitted torque capacity command value tTcl2 at a predetermined first increase gradient R1 from the state of starting to slip; and a second increase operation (S106) to increase the second clutch transmitted torque capacity command value tTcl2 at a second increase gradient R2 smaller than the first increase gradient R1. According to this configuration, during the cranking operation, the first increase operation to increase second clutch transmitted torque capacity command value tTcl2 at first increase gradient R1 relatively large in rate of increase is first performed, and then the second increase operation to increase second clutch transmitted torque capacity command value tTcl2 at second increase gradient R2 relatively small in rate of increase is performed. This serves to delay the timing when the second clutch transmitted torque capacity reaches cranking-condition torque limit value Tcrlim, as compared to the case where the increase is implemented only by first increase gradient R1 relatively large in rate of increase. This serves to suppress the output from second clutch CL2 to the driving wheel side from being limited by cranking-condition torque limit value Tcrlim, and thereby reduce the delay of acceleration, as compared to the case where the limitation to the output occurs early. On the other hand, it is possible to ensure vehicle acceleration, as compared to the case where the increase is implemented only by second increase gradient R2 relatively small in rate of increase. In this way, according to the first embodiment, in the situation where the vehicle is accelerated along with cranking with limitation to the torque from the driving force of motor generator MG available for running, it is possible to ensure vehicle acceleration, and thereafter suppress the delay of acceleration resulting from the limitation by cranking-condition torque limit value Tcrlim.

<b> The hybrid vehicle control apparatus according to the first embodiment is configured such that the second clutch torque increase gradient control part 400*b* is configured to set the first increase gradient R1 and the second increase gradient R2 so as to cause the transmitted torque capacity of the second clutch to reach the cranking-condition torque limit value Tcrlim in time proximity to completion of the cranking operation (at time instant t5 in FIG. 13). This setting makes it possible to minimize the period when the increase of second clutch transmitted torque capacity command value tTcl2 is maintained at cranking-condition torque limit value Tcrlim. This makes it possible to generate vehicle acceleration during cranking, and thereby enhance accelerator response.

<c> The hybrid vehicle control apparatus according to the first embodiment is configured such that the second clutch torque increase gradient control part 400*b* includes an increase gradient setting part 400*c* configured to set the first increase gradient R1 and the second increase gradient R2 depending on an accelerator opening APO in a manner that the first increase gradient R1 and the second increase gradient R2 increase as the accelerator opening APO increases (FIG. 11A). Accordingly, as the driver's acceleration request increases, the rise of vehicle acceleration becomes rapid to enhance the accelerator response. Moreover, according to the first embodiment, the configuration that increase gradient setting part 400*c* sets first increase gradient R1 and second increase gradient R2 for each gear position of automatic transmission AT, it is possible to set the accelerator response in accordance with each gear position.

<d> The hybrid vehicle control apparatus according to the first embodiment is configured such that the second clutch torque increase gradient control part 400*b* includes a gradient shift threshold value setting part 400*d* configured to set a gradient shift threshold value T1 depending on an accelerator opening APO in a manner that the gradient shift threshold value T1 increases as the accelerator opening APO increases, wherein shifting from the first increase gradient R1 to the second increase gradient R2 is performed at the gradient shift threshold value T1. Accordingly, as the driver's acceleration request increases, the period when second clutch transmitted torque capacity command value tTcl2 is increased at first increase gradient R1 becomes larger to make the rise of vehicle acceleration more rapid. This serves to increase the vehicle acceleration as the driver's acceleration request increases, and thereby enhance the accelerator response. Moreover, according to the first embodiment, the configuration that gradient shift threshold value setting part 400*d* sets gradient shift threshold value T1 for each gear position of automatic transmission AT, it is possible to set the accelerator response in accordance with each gear position.

<e> The hybrid vehicle control apparatus according to the first embodiment is configured such that the second clutch torque increase gradient control part 400*b* is configured to perform a rapid-acceleration-condition operation to increase the transmitted torque capacity of the second clutch to the cranking-condition torque limit value Tcrlim constantly at the first increase gradient R1 in response to a rapid acceleration condition where an accelerator opening APO is greater than a set value. Under such a rapid acceleration condition, the time period required to start the engine is short, so that the time period when second clutch transmitted torque capacity command value tTcl2 is limited by cranking-condition torque limit value Tcrlim is short, and the delay of acceleration is unlikely to occur. In this situation, it is possible to enhance the accelerator response by causing the second clutch transmitted torque capacity command value tTcl2 to rise similar to target driving torque tFoO.

<f> The hybrid vehicle control apparatus according to the first embodiment is configured such that the gradient shift threshold value setting part 400*d* is configured to set the gradient shift threshold value T1 greater than the cranking-condition torque limit value Tcrlim under the rapid acceleration condition, so as to allow the second clutch torque increase gradient control part 400*b* to perform the rapid-acceleration-condition operation. Under the rapid acceleration condition, second clutch transmitted torque capacity command value tTcl2 reaches cranking-condition torque limit value Tcrlim before reaching gradient shift threshold value T1 by the increase at first increase gradient R1. In this way, it is possible to perform rapid acceleration operation only by changing the setting of gradient shift threshold value T1, with a low cost, as compared to a case where a control operation part for rapid acceleration operation is newly configured.

Although the hybrid vehicle control apparatus according to the present invention is described with reference to the embodiment, specific configuration is not limited to the embodiment, and modification, addition, etc. of design may be allowed unless it goes beyond the subject matter of the claimed invention.

For example, although the rear wheel drive vehicle is employed as the hybrid vehicle in this embodiment, the invention may be applied to front wheel drive vehicles and all-wheel drive vehicles. In the present embodiment, the second clutch torque increase gradient control part manipulates the second clutch transmitted torque capacity command value for controlling the second clutch transmitted torque capacity. However, the second clutch torque increase gradient control part may be configured to perform the control based on the second clutch transmitted torque capacity calculated based on the output torque from the motor and the output torque from the transmission.

Mutual Reference to Related Application

The present application claims priority based on Japanese Patent Application 2012-280506 filed with the Japanese Patent Office on Dec. 25, 2012. The entire disclosure thereof is completely incorporated herein by reference.

The invention claimed is:

1. A hybrid vehicle control apparatus comprising:
an engine and a motor provided as drive sources of a vehicle;
first and second clutches disposed in a driveline from the drive sources to a driving wheel, wherein the first clutch is disposed between the engine and the motor, and configured to vary a transmitted torque therebetween, and wherein the second clutch is disposed between the motor and the driving wheel, and configured to vary a transmitted torque therebetween;
an engine start control part configured to start the engine by bringing the first clutch into slip-engaged state, and allowing the second clutch to slip, and increasing a driving torque of the motor, in response to a determination by an engine start request determination means that an engine start request is present in an EV mode, wherein the determination is based on a running state and an operating state of the vehicle, and wherein the EV mode allows driving by the driving torque of the motor with the first clutch disengaged and the second clutch engaged;
the engine start control part being configured to perform:
a slip start operation to cause the second clutch to slip;
a cranking operation to crank the engine by bringing the first clutch into slip-engaged state, and maintaining the second clutch in slipping state by setting transmitted torque capacity of the second clutch smaller than or equal to a set cranking-condition torque limit value; and
a clutch engagement operation to control the first clutch and the second clutch into completely engaged state in response to a condition that the engine is in driving state; and
a second clutch torque increase gradient control part included in the engine start control part, and configured to perform the following while the cranking operation is being performed:
a first increase operation to increase the transmitted torque capacity of the second clutch at a predetermined first increase gradient from the state of starting to slip; and
a second increase operation to increase the transmitted torque capacity of the second clutch at a second increase gradient smaller than the first increase gradient.

2. The hybrid vehicle control apparatus as claimed in claim 1, wherein the second clutch torque increase gradient control part is configured to set the first increase gradient and the second increase gradient so as to cause the transmitted torque capacity of the second clutch to reach the cranking-condition torque limit value in time proximity to completion of the cranking operation.

3. The hybrid vehicle control apparatus as claimed in claim 1, wherein the second clutch torque increase gradient control part includes an increase gradient setting part configured to set the first increase gradient and the second increase gradient depending on an accelerator opening in a manner that the first increase gradient and the second increase gradient increase as the accelerator opening increases.

4. The hybrid vehicle control apparatus as claimed in claim 1, wherein the second clutch torque increase gradient control part includes a gradient shift threshold value setting part configured to set a gradient shift threshold value depending on an accelerator opening in a manner that the gradient shift threshold value increases as the accelerator opening increases, wherein shifting from the first increase gradient to the second increase gradient is performed at the gradient shift threshold value.

5. The hybrid vehicle control apparatus as claimed in claim 1, wherein the second clutch torque increase gradient control part is configured to perform a rapid-acceleration-condition operation to increase the transmitted torque capacity of the second clutch to the cranking-condition torque limit value constantly at the first increase gradient in response to a rapid acceleration condition where an accelerator opening is greater than a set value.

6. The hybrid vehicle control apparatus as claimed in claim 5, wherein the second clutch torque increase gradient control part includes a gradient shift threshold value setting part configured to set a gradient shift threshold value depending on an accelerator opening in a manner that the gradient shift threshold value increases as the accelerator opening increases, wherein shifting from the first increase gradient to the second increase gradient is performed at the gradient shift threshold value, and wherein the gradient shift threshold value setting part is configured to set the gradient shift threshold value greater than the cranking-condition torque limit value under the rapid acceleration condition, so as to allow the second clutch torque increase gradient control part to perform the rapid-acceleration-condition operation.

* * * * *